Oct. 3, 1933.   W. WADDELL   1,929,196
REDUCTION DRIVE FOR ENGINES
Filed Jan. 8, 1932
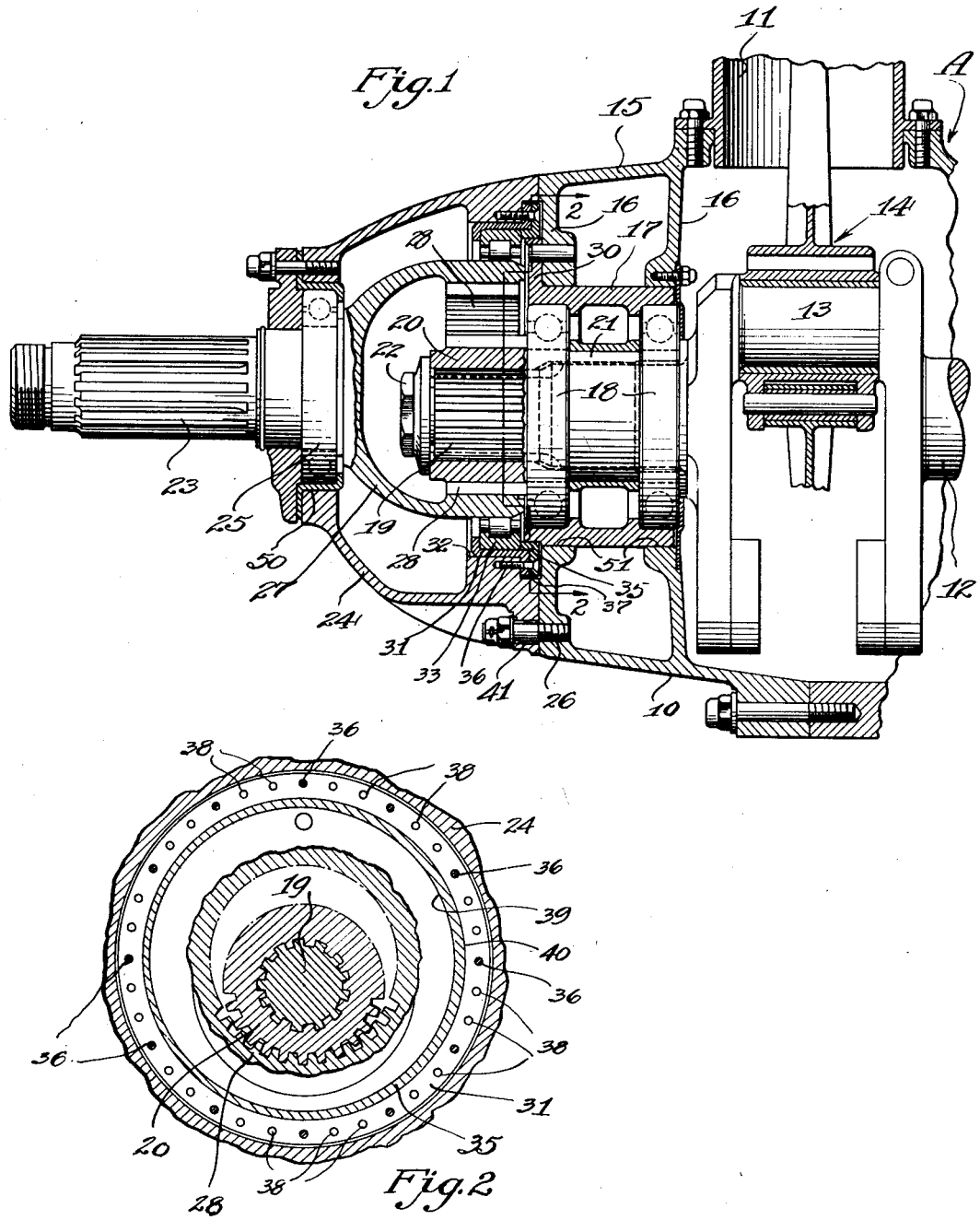
INVENTOR.
William Waddell
BY
ATTORNEY.

Patented Oct. 3, 1933

1,929,196

UNITED STATES PATENT OFFICE 1,929,196

REDUCTION DRIVE FOR ENGINES

William Waddell, Detroit, Mich., assignor, by mesne assignments, to Continental Aircraft Engine Company, Detroit, Mich., a corporation of Delaware Application January 8, 1932. Serial No. 585,555

9 Claims. (Cl. 74—7)

My invention relates to engines and more particularly to a propeller shaft supporting and driving means adapted for assembly with an aircraft engine, but it will be understood that the principles of my invention may be incorporated in engines other than the radial cylinder type herein illustrated and in engines other than those used for aircraft.

In order to better adapt an engine of the aforesaid type for use with different types of aircraft and for obtaining the maximum of benefit from the associated power plant, it is now customary to drive the propeller at a different speed than the engine and usually at a lesser speed, thereby permitting the use of a larger propeller and providing propeller blades of a relatively steeper pitch if so desired. This is usually accomplished by employing a speed reduction mechanism intermediate the engine crankshaft and propeller shaft and I find that cooperating gears of the type shown in the illustrated embodiment of my invention which comprises an internal gear carried by the propeller shaft and an external gear carried by the crankshaft are very satisfactory.

One difficulty with the reduction gearing herein illustrated has been the trouble encountered in accurately positioning the driving and driven elements in assembling the engine and also in taking up clearance between said elements when the same become worn.

An object of my invention is to construct an improved propeller shaft drive of the type including driving and driven elements respectively carried by the engine crankshaft and propeller shaft by incorporating therewith means for relatively adjusting the position of the crankshaft and propeller shaft whereby to effect a predetermined relative adjustment of said driving and driven elements.

A further object of my invention is to construct an improved propeller shaft drive of the aforesaid type by providing means for relatively shifting the propeller shaft supporting means with respect to the crankshaft axis whereby to relatively position the said driving and driven elements.

For a more detailed understanding of my invention, reference may be had to the accompanying drawing which illustrates one form which my invention may assume, and in which:

Fig. 1 is a longitudinal sectional view through a portion of an internal combustion engine and illustrating my improved propeller shaft drive, and Fig. 2 is a transverse sectional view taken on the line 2—2 of Fig. 1.

For purposes of illustration I have chosen to illustrate my invention as incorporated with an engine of the radial cylinder type, though obviously the principles of said invention may be incorporated in engines other than those of the radial type. In the illustrated embodiment of my invention I have provided an engine structure A which includes a crankcase 10 to which a plurality of cylinders 11 may be secured. A crankshaft 12 is arranged to be supported preferably by the crankcase in suitable bearings and is provided with a crank portion 13 arranged for connection with a suitable articulated rod structure 14.

The forward portion of the crankcase is preferably provided with the extended portion 15 carrying suitable inwardly extending partitions 16 adapted for supporting a bearing sleeve 17 which is so constructed as to support the spaced bearing structures 18 for supporting the forward end of the crankshaft. The forward end of the crankshaft is preferably extended beyond the forward face of the crankcase and the end thereof is preferably splined at 19 to which a driving gear 20 may be secured. Preferably the driving gear 20 is provided with a rearwardly extending hub portion 21 arranged to extend within the bearing structures 18 in order to support the driving gear by the crankcase. A nut or other suitable locking means 22 may be utilized to lock the driving gear 20 to the crankshaft.

A propeller shaft 23 is provided and is preferably supported in a propeller shaft supporting means or housing 24, said housing carrying a bearing structure 25 for rotatively supporting said propeller shaft. The housing 24 is sometimes referred to as the nose and is adapted to be secured to the crankcase by bolts or other suitable fastening devices 26. The inner or rear end portion of the propeller shaft is preferably enlarged as at 27 and carries the internal gear 28 which is arranged for engagement with the driving gear 20. Preferably the driving and driven elements, or gears 20 and 28 respectively are constructed for direct engagement. Preferably the axis of the propeller shaft is parallel with and offset with respect to the crankshaft axis substantially in the manner as shown in the drawing.

With this type of propeller shaft drive it is quite essential that the driving and driven elements respectively associated with the crankshaft and propeller shaft be accurately positioned as to avoid the tendency of the same to bind in operation. Furthermore, there is a tendency of these gears to wear and from time to time it is found desirable and advisable to take up the clearance between the engaging driving and driven elements of the propeller shaft drive mechanism.

In my present invention I have provided a simple arrangement by which the propeller shaft and crankshaft axes can be relatively shifted to properly position the driving and driven elements of the propeller shaft drive mechanism. In the illustrated embodiment of my invention the bearing 17 is extended beyond the forward end of the crankcase and carries an eccentric portion 30, the diameter of this eccentric portion being preferably greater than the diameter of the sleeve and having an axis substantially aligned with the theoretical axis of the propeller shaft. The eccentricity of the eccentric portion 30 which may be sometimes referred to as a pilot, is preferably about 0.6″ whereby to provide sufficient eccentricity to engage the driving element or gear 20 with the enlarged internal gear 28 carried by the propeller shaft. This eccentricity provides the desired offset of the propeller shaft and crankshaft axes.

The propeller shaft housing or supporting means 24 is positioned by the eccentric portion 30. A sleeve 31 preferably constructed of steel or other metal having similar characteristics is shrunk into the opening 32 carried by the propeller shaft supporting means or housing 24, said housing being preferably constructed of aluminum or other suitable metal and as is well known, the aluminum is subject to a greater expansion than the steel when exposed to heat. However, the fit between the steel sleeve 31 and the aluminum housing is such as to not permit the sleeve to become loose on the expansion of the housing relative to the steel sleeve said relative expansion being less than the amount of shrink fit of the sleeve in said aluminum housing. The steel sleeve carries inwardly thereof the bearing structure 33 for supporting internally thereof the internal gear 28 formed in the enlarged rearward portion of the propeller shaft.

The relative shifting of the propeller shaft and crankshaft axes is accomplished by providing an eccentric adjusting ring 35 which may be adjustably secured to the housing structure 24 by means of screws or other fastening devices 36. As noted in Fig. 2 the eccentric ring 35 is provided with a radially outwardly extending flange portion 37 provided with a plurality of holes or other suitable perforations 38. The inner peripheral face 39 of the eccentric ring 35 is adapted for engagement with the outer peripheral bearing surface of the eccentric pilot member 30 and this inner peripheral face 39 is concentric with the eccentric pilot. The outer peripheral bearing face 40 of the eccentric ring 35 is concentric with and adapted for cooperative engagement with the inner peripheral bearing face of the steel sleeve 31 fixed to the propeller shaft supporting means or housing 24. However, the centers of the peripheral bearing surfaces 39 and 40 are offset and thus the said circular bearing surfaces are eccentric to each other as clearly shown in Fig. 2. The eccentricity of these bearing surfaces 39 and 40 is preferably about 0.008″ which is sufficient to provide the necessary adjustment. It will be obvious however, that the eccentricity of the pilot member 30 and the relative eccentricity of the bearing surfaces of the eccentric ring 35 may be varied as desired, the relative size, type of gears employed in the propeller shaft drive mechanism, and the amount of speed change required determining the amount of eccentricity of these aforesaid members.

The shifting of the propeller shaft axis with respect to the crankshaft axis which thereby relatively shifts the driving and driven elements or gears 20 and 28 for relatively adjusting the same, may be very readily accomplished by angularly shifting the eccentric ring 35 with respect to the propeller shaft housing to which it is secured. To obtain this adjustment the housing structure 24 is removed from the crankcase and the eccentric ring 35 may be loosened by removing the screws or fastening devices 36. The ring can thus be angularly shifted any desired amount found necessary and again secured to the propeller shaft supporting means or housing 24. The housing is then secured to the crankcase by the bolts 26. Preferably sufficient clearance is provided between these bolts and the housing structure or member 24 as at 41 to permit the relative shifting of the housing 24 with respect to the crankcase to which it is secured.

The construction described above provides means for obtaining a very fine adjustment of the cooperating elements of the propeller shaft drive mechanism and the relative adjustment of said elements is obtained without angularly shifting the propeller shaft supporting means. With the construction herein described the proper adjustment may be made during assembly of the engine at the factory and the propeller shaft housing may be removed whenever desired and be assembled with the crankcase without destroying or altering the adjustment. When necessary to relatively adjust the elements of the propeller shaft drive mechanism, the adjustment can be readily obtained and it is preferable that this adjustment be made by one who is experienced in the work and it is quite customary to send engines of this character to the factory for overhauling at certain intervals at which time the necessary adjustment of the elements is made by experienced workmen and when so made the propeller shaft and housing can be disassembled from the crankcase and reassembled again without effecting the adjustment.

The arrangement and construction herein illustrated provides a structure which can be readily and accurately machined in production since the bores 28 and 50 of the housing 24 respectively supporting the bearing structures 33 and 25 are axially aligned and the openings 51 in the partition 16 carried by the crankcase are also axially aligned, with respect to each other. The construction as described above materially facilitates the manufacture of aircraft engines and in addition, provides a structure in which adjustment of cooperating driving and driven elements may be accurately obtained.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an engine of the character described having in combination, a crankshaft, a propeller shaft, driving and driven elements respectively carried by the crankshaft and propeller shaft and adapted for operative driving connection, means for supporting the propeller shaft, a crankcase for supporting said crankshaft, means including a shiftable eccentric device adjustably secured to the propeller shaft supporting means and cooperatively engaged with said crankcase whereby to provide for a predetermined relative adjustment of said driving and driven elements, and means for securing said propeller shaft supporting means to said crankcase.

2. In an engine of the character described having in combination, a crankshaft, a propeller shaft, driving and driven elements respectively carried by the crankshaft and propeller shaft and adapted for operative driving connection, a structure for supporting the propeller shaft, a crankcase structure for supporting said crankshaft, means including an angularly shiftable eccentric ring adjustably secured to one of said structures and engaged with the other whereby to provide for a predetermined relative adjustment of said driving and driven elements, and means for securing said propeller shaft supporting structure to said crankcase structure.

3. In an engine of the character described having in combination, a crankcase means, a crankshaft supported thereby, a propeller shaft, means for supporting said propeller shaft, driving connections intermediate the crankshaft and propeller shaft, and an eccentric ring assembled intermediate both said means and adjustably secured to one of said means whereby to provide means for effecting a predetermined selective relative adjustment of said propeller shaft and crankshaft axes, and means for securing said propeller shaft supporting means to said crankcase means.

4. In an engine of the character described having in combination, a crankcase means, a crankshaft supported thereby, a propeller shaft, means for supporting said propeller shaft, driving connections intermediate the crankshaft and propeller shaft, and an eccentric ring assembled intermediate both said means and adjustably secured to said propeller shaft supporting means whereby to provide means for effecting a predetermined selective relative adjustment of said propeller shaft and crankshaft axes, and means for securing said propeller shaft supporting means to said crankcase means.

5. In an engine of the character described having in combination, a crankcase means, a crankshaft supported thereby, a propeller shaft, means for supporting said propeller shaft, driving connections intermediate the crankshaft and propeller shaft, said crankcase means having a pilot constructed eccentrically with respect to said crankshaft axis, an eccetric ring assembled intermediate said pilot and said propeller shaft supporting means and adjustably secured to said propeller shaft supporting means, said ring adapted for cooperative engagement with said pilot whereby to provide means for effecting a predetermined relative adjustment of said propeller shaft and crankshaft axes, and means for securing said propeller shaft supporting means to said crankcase means.

6. In an engine of the character described having in combination, a crankcase means, a crankshaft supported thereby, a propeller shaft, means for supporting said propeller shaft, driving connections intermediate the crankshaft and propeller shaft, said crankcase means having a pilot constructed eccentrically with respect to said crankshaft axis, a ring cooperatively associated with said propeller shaft supporting means and angularly shiftable about the propeller shaft axis, said ring having an internal peripheral bearing surface eccentric with respect to said propeller shaft axis, said internal peripheral bearing surface of the ring arranged for cooperative engagement with the pilot carried by the crankcase means whereby to provide means for effecting a relative shifting of said propeller shaft supporting means and said crankcase means to adjustably position the propeller shaft relative to the crankshaft and means for securing said propeller shaft supporting means to said crankcase means.

7. In an engine of the character described having in combination, a crankcase structure, a crankshaft, a propeller shaft, a propeller shaft housing structure for supporting said propeller shaft, driving means intermediate the crankshaft and propeller shaft, and adjustable means associated with said shafts, said means including an eccentric element eccentrically engaged with one of said structures and adjustably secured to said other structure, said last mentioned means being actuatable to adjust the propeller shaft axis relative to the crankshaft axis.

8. In an engine of the character described having in combination, a crankcase structure, a crankshaft, a propeller shaft, a propeller shaft housing structure for supporting said propeller shaft, driving means intermediate the crankshaft and propeller shaft, and adjustable means associated with said shafts, said means including an angularly shiftable eccentric element eccentrically engaged with one of said structures and adjustably secured to said other structure, said last mentioned means being actuatable to adjust the propeller shaft axis relative to the crankshaft axis.

9. In an engine of the character described having in combination, a crankcase structure, a crankshaft, a propeller shaft, a propeller shaft housing structure for supporting said propeller shaft driving means intermediate the crankshaft and propeller shaft and adjustable means associated with said shafts, said means including an angularly shiftable ring having inner and outer eccentric bearing portions respectively engaging said structures and adjustably secured to one of said structures, said last mentioned means being actuatable to adjust the propeller shaft axis relative to the crankshaft axis.

WILLIAM WADDELL.